Patented Jan. 3, 1939

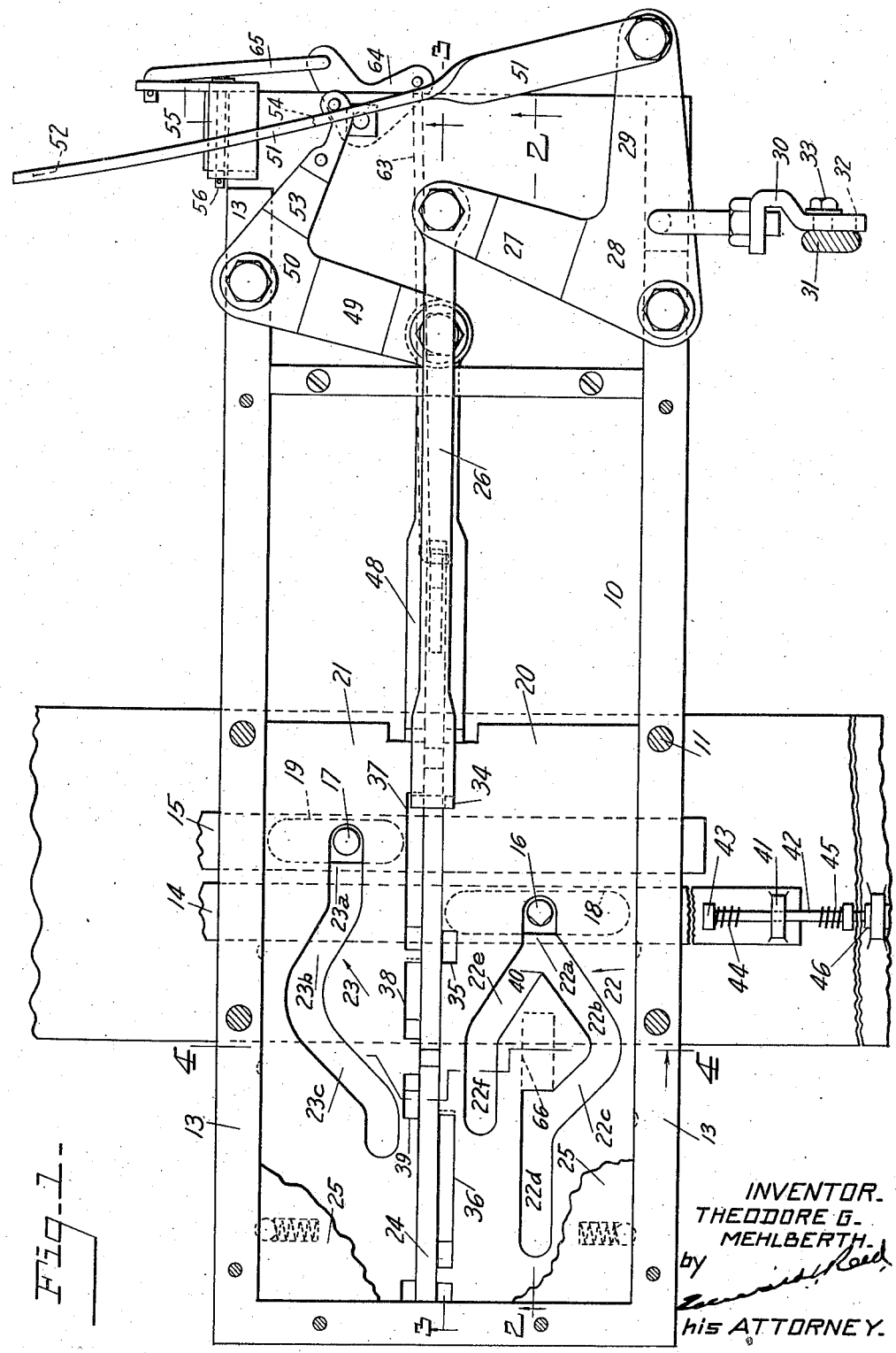

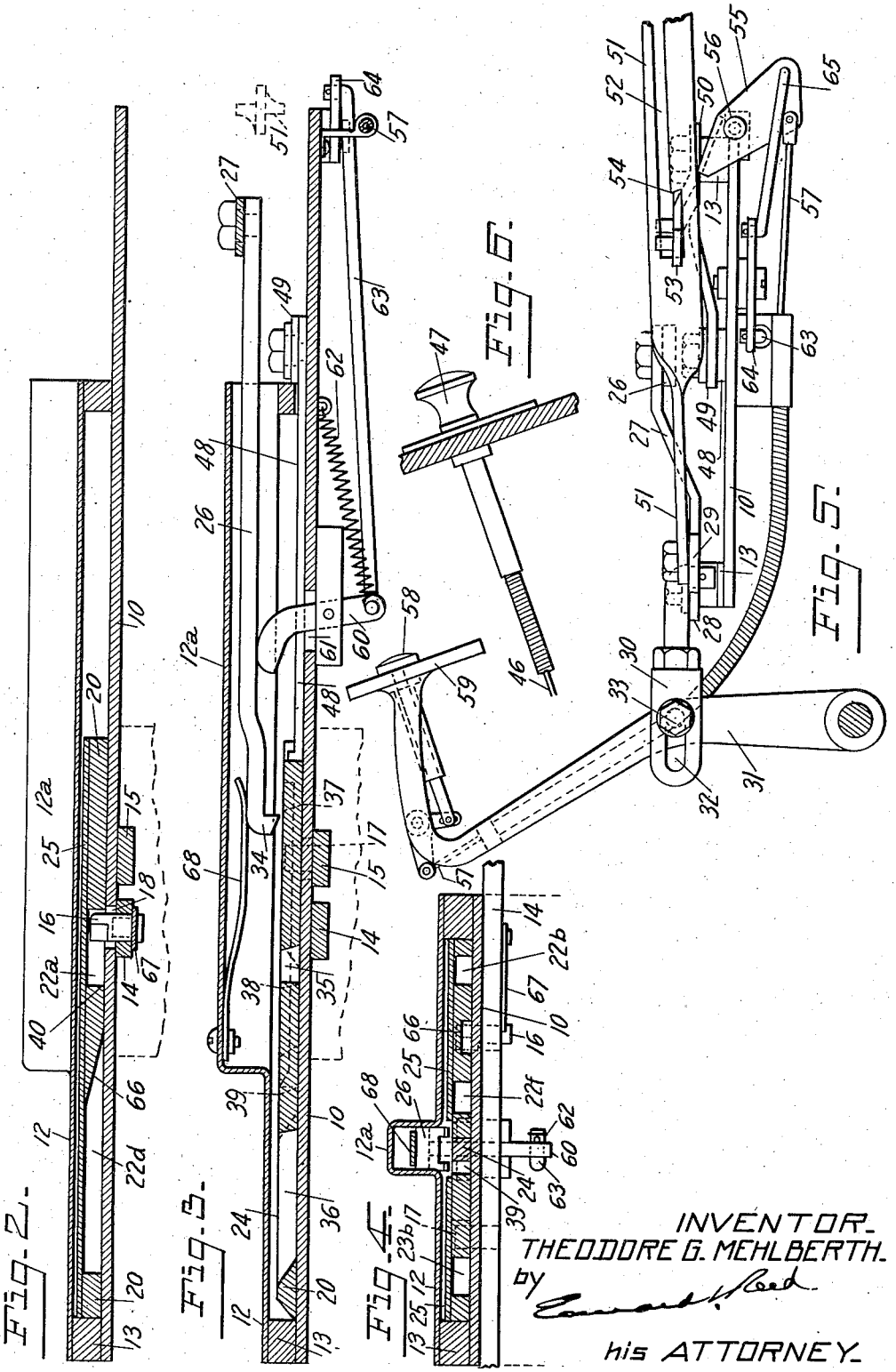

2,142,732

UNITED STATES PATENT OFFICE 2,142,732

GEAR SHIFTING DEVICE

Theodore G. Mehlberth, Dayton, Ohio

Application December 21, 1936, Serial No. 117,016

25 Claims. (Cl. 74—474)

This invention relates to a gear shifting device and is designed primarily for use in connection with the transmission mechanism of an automobile.

One object of the invention is to provide means whereby the gears may be shifted in proper order by the manipulation of the clutch actuating device of the automobile.

A further object of the invention is to provide such a device with means controlled by the clutch actuating device for restoring the gears to their neutral positions.

A further object of the invention is to provide such a device which will be simple in its construction and positive in operation and which may be applied to the transmission mechanism with little or no change in the latter.

Other objects of the invention may appear as the apparatus is described in detail.

In the accompanying drawings Fig. 1 is a plan view of a gear shifting device embodying my invention, partly broken away; Fig. 2 is a longitudinal section taken on the line 2—2 of Fig. 1; Fig. 3 is a longitudinal section taken on the line 3—3 of Fig. 1; Fig. 4 is a transverse section taken on the line 4—4 of Fig. 1, looking in the direction of the arrows; Fig. 5 is an end elevation of the device; and Fig. 6 is a detail of the actuating device which controls the reversing means.

In these drawings I have illustrated one embodiment of the invention and have shown the several parts of the apparatus as mounted upon a supporting structure which preferably comprises a base plate 10 adapted to be supported in fixed relation to the transmission case of the automobile and which preferably is mounted on the transmission case by removing the cover of the latter and securing the base plate to the transmission case, as by means of screws 11. The supporting structure may also include a cover plate 12 mounted on the base plate and spaced therefrom by marginal strips 13. In the present arrangement the supporting structure or base plate extends transversely to the length of the automobile and therefore transversely to the transmission mechanism. Mounted beneath the base plate are two gear actuating devices which are here shown as comprising bars 14 and 15 having studs 16 and 17 extending upwardly through longitudinal slots 18 and 19 in the base plate 10. These bars extend transversely to the base plate and therefore move lengthwise of the transmission and they may be connected with the shiftable gears by the usual or any suitable means.

Mounted on the supporting structure for movement lengthwise thereof are two controlling members 20 and 21 having cam grooves 22 and 23 to receive and impart movement to the respective studs 16 and 17 of the gear actuating devices. In the arrangement shown these controlling members are in the form of plates arranged side by side and slidably mounted in guideways formed between the lateral spacing members 13 and a longitudinal rib 24 extending lengthwise of the base plate. In the present instance the cam grooves extend entirely through the two plates and are closed on their upper sides by cover plates 25, although these cover plates are not essential. The cam grooves are so shaped that the forward movements of the two controlling plates, in proper sequence, will cause the gears to be shifted into proper positions for low, intermediate and high speeds or for reverse. The groove 22 in the controlling plate 20 comprises a straight longitudinal portion 22a in which the stud 16 rests when the controlling plate is in its rearmost or initial position. A transverse portion 22b extending obliquely from the portion 22a toward the outer edge of the controlling plate serves, upon the first forward movement of the controlling plate, to shift the gear actuating device 14 and its connected gear into low speed position. At its outer end the portion 22b merges into an oblique portion 22c extending inwardly and serving, upon a second forward movement of the controlling member 20, to restore the gear actuating device 14 and its gear to neutral position. A longitudinal portion 22d at the rear end of the portion 22c retains the gear actuating device in its neutral position during the continued forward movement of the controlling plate. The groove 22 also has an oblique branch or portion 22e extending from the portion 22a toward the inner edge of the controlling plate to move the gear actuating device 14 and its connected gear into reverse position, this part 22e terminating in a straight portion 22f.

The groove 23 in the controlling plate 21 comprises a straight forward portion 23a in which the stud 17 rests when the plate 21 is in its rearmost or initial position. An oblique portion 23b extending from the portion 23a toward the outer edge of the plate 21 serves upon the first forward movement of the plate 21 to shift the gear actuating device 15 and its connected gear to intermediate or second speed position. An oblique portion 23c extending inwardly from the portion 23b serves to move the actuating device 15 and its gear to high speed position upon the second forward movement of the controlling plate 21.

A suitable operating device is provided for imparting forward movement to the controlling members and this operating device and the controlling members have cooperating parts so arranged that the plates will be advanced in proper sequence to effect the desired movements of the gears. In the construction here shown this actuating device comprises a longitudinal bar 26 pivotally connected at its forward end to one arm 27 of a bell crank 28, the other arm 29 of which is provided with means, such as a link 30, for connecting the same with a clutch operating foot lever 31. Preferably the link is provided with a slot 32, through which the connecting bolt 33 extends, to permit the lever to have sufficient movement to release the clutch before movement is imparted to the operating bar. The continued movement of the foot lever after the clutch has been released will actuate the bell crank to move the operating bar to its foremost position, in which position it is shown in the drawings. When the foot lever is released it will be restored to its normal position by the usual springs to reengage the clutch and this movement of the lever will cause the bell crank to move the actuating bar rearwardly above the adjacent edges of the two controlling plates. The operating bar may be guided in its movement in any suitable manner. In the present instance the cover plate 12 is provided with a longitudinal channel 12a in which the operating bar is guided, and a flat spring 68 arranged within this guide channel bears upon the operating bar to press the same toward the controlling plates and to positively effect the operative connection of the operating bar with the plates, as hereinafter described. At its rear end the controlling bar 26 has a hook shaped portion or nose 34 adapted to engage suitable projections on the respective plates. In the particular construction illustrated these projections are formed by providing the plates in their adjacent edges with recesses. The controlling plate 20 has in its forward portion a recess 35 of short length and in its rear portion a recess 36 of substantial length. The controlling plate 21 has in its inner edge and near the forward end thereof a recess 37, in the rear of which is an intermediate recess 38 and a rear recess 39. The hook-shaped or nose portion 34 of the operating bar is slotted to permit it to straddle the longitudinal rib 24 and thus enter recesses in both plates. When the clutch is engaged and the operating bar is in its rearmost position the nose 34 thereof will be positioned adjacent to or above the intermediate recess 38 of the controlling plate 21 but will be supported above that recess by its contact with the edge portion of the plate 20 between the recesses 35 and 36. Upon the forward movement of the operating bar the nose thereof will drop into the recess 35 of the controlling plate 20 and the recess 37 of the controlling plate 21 and the continued movement of the operating bar will cause the plate 20 to be advanced a distance sufficient to shift the gear actuating device 14 and its gear into low speed position. The nose of the operating device will travel in the long slot 37 of the controlling plate 21 and no movement will be imparted to the latter. After the transmission has thus been set in low the clutch is reengaged, thereby again moving the nose of the operating bar to a position above the recess 38 of the controlling plate 21 but at this time the slot 36 of the controlling plate 20 has been moved to a position alongside the recess 38 and the nose of the operating bar will enter both recesses and upon the next forward movement of the operating bar both plates 20 and 21 will be advanced. The forward movement of the plate 20 restores the gear actuating device 14 and its gear to neutral position, while the forward movement of the controlling plate 21 moves the gear actuating device 15 and its gear into second speed position. It will be noted that the straight forward position 23a of the groove 23 is of such length that the gear actuating device 14 may return to neutral position before the gear actuating device 15 is shifted. When the foot lever is released and the clutch reengaged the nose of the actuating bar will be brought into a position to enter the recess 39 of the controlling plate 21 and the rear portion of the long recess 36 of the controlling plate 20. Thus the next forward movement of the operating bar will advance the plate 21 to move the gear actuating device 15 and its gear into high speed position but no movement will be imparted to the controlling plate 20.

The gear actuating device 14 and its gear may be shifted by the plate 20 into positions to reverse the direction of movement of the automobile, this being accomplished by causing the stud 16 to enter the inner oblique groove 22e. The diverging grooves 22b and 22e form between them a wedge-shaped point 40 and the stud 16 has its rear side tapered to facilitate its engagement with one side or the other of the point 40. The direction in which the stud will be moved is controlled by an initial adjustment of the stud prior to the operation of the controlling plate. The gear actuating bar 14 normally has a small amount of lost motion and, in the present instance, I have utilized this lost motion for selectively controlling the direction of movement of the stud by the controlling plate. For this purpose I provide the outer end of the plate 14, which extends laterally beyond the base plate, with an apertured lug 41 in which is slidably mounted a rod 42 provided with stops 43 spaced from the respective sides of the lug. Coiled about this rod and confined between the lug 41 and the respective stops 43 are springs 44 and 45. The tension of the springs is manually controlled by a device arranged for manipulation by the operator or driver of the automobile and, as here shown, a Bowden wire 46 connects the rod 45 with a pull rod 47 on the instrument board of the automobile. When this push rod is in one position the spring 44 will be compressed and will move the actuating bar 14 outwardly to cause the stud 16 to engage the outer side of the portion 22a of the groove 22, this portion of the groove being of a width slightly greater than the diameter of the stud. Thus the stud is so positioned with relation to the controlling plate 20 that it will engage the outer side of the point 40 and will be thereby guided into the part 22b of the cam groove. The movement of the push rod to its other position places the outer spring 45 under tension and thus moves the stud 16 into engagement with the inner wall of the portion 22a of the cam slot so that it will be guided into the part 22e of the groove and the gear actuating device shifted to reverse position.

Suitable means are provided for restoring the controlling plates to their rearmost or initial positions after they have been fully or partly advanced and in the drawings the several parts are shown in the positions which they occupy after the controlling plates have been restored to their initial positions and before the clutch lever has been released to reengage the clutch. In the present construction, this restoring means comprises a push bar 48 slidably mounted upon the base plate 10 and having its rear end arranged to engage the forward ends of both controlling plates. At its forward end this push bar is pivotally connected with one arm 49 of a bell crank 50 which is adapted to be actuated at the will of the operator. Preferably normally inoperative means are provided for connecting the bell crank with the foot lever of the clutch and other means are provided for establishing this connection when desired. In the arrangement here shown a link 51 is pivotally connected at one end with the arm 29 of the bell crank 28 and extends transversely to the base plate. This link is provided with a longitudinal slot 52 into which the second arm 53 of the bell crank 50 extends. The lower edge of the slot 52 is recessed near the forward end thereof to form a shoulder 54 adapted to be moved into and out of a position to engage the arm 53. The connection between the link and the bell crank 28 is sufficiently loose to permit of a slight vertical movement of the free end of the link and normally the link assumes a position in which the shoulder 54 lies below the end of the arm 53 and the link therefore has free movement with relation to the arm without affecting the position of the latter. When it is desired to restore the controlling plates to their initial positions the free end of the link 51 is elevated to bring the shoulder 54 into operative relation to the arm 53 and thus the operation of the link by the foot lever will cause the bell crank 50 to impart operative movement to the restoring bar 48.

Any suitable means may be provided whereby the operator may shift the link 52 to establish an operative connection between the same and the bell crank 50. In the present instance a cam lever 55 is pivotally mounted on the base plate at 56 and engages the lower edge of the link 51 so that its movement about its axis will raise or lower the link. This cam lever is connected by a Bowden wire 57 with an actuating device which preferably comprises a push rod 58 carried by the foot lever and arranged adjacent to one side of the treadle 59 of the foot lever so that the lever may be operated without actuating the push rod, but when it is desired to restore the mechanism to neutral the operator may press the push rod inwardly to establish the operative connection between the foot lever and the restoring mechanism and the continued pressure on the push rod will actuate the foot lever and thus cause the restoring mechanism to be operated. It will be noted that during the operative movement of the restoring bar 48 the operating bar 26 is moving forwardly, because it is permanently connected with the foot lever, and in order to prevent the operating lever from engaging, or interfering with the reverse movement of, the controlling members means are provided for supporting the nose 34 of the operating bar in inoperative relation to the controlling members, the connection between the operating bar and the bell crank 28 being sufficiently loose to permit of this movement thereof. In the particular arrangement here shown a cam lever 60 is pivotally mounted on the base plate 10 and extends through a slot 61 therein so that its cam shaped upper end may be moved into and out of engagement with the lower surface of the operating bar. A spring 62 normally holds the cam 60 in an inoperative position. It is preferably moved to its operative position simultaneously with the establishment of the operative connection between the restoring means and the clutch lever. For this purpose the cam lever is connected by a link 63 with one arm of a bell crank lever 64, the other arm of which is connected by a link 65 with the cam lever 55, the arrangement being such that the operation of the cam lever 55 to establish an operative connection between the link 51 and the bell crank 50 will also cause the cam lever 60 to be operated to move the operating bar to an inoperative position.

When the controlling plates are restored to their initial positions the stud 17 will follow in a reverse direction through the cam groove 23, but the controlling plate 20 is provided with a tapered channel 66, in line with the parts 22a and 22d of the groove 22, so that upon the reverse movement of the controlling plate 20 no movement will be imparted to the stud 16. To permit it to ride over the inclined surface 66 the stud 16 is vertically yieldable and, as here shown, it is slidably mounted in the bar 14 and is held normally in its uppermost or normal position by a flat spring 67 secured at one end to the bar 14 and acting on the stud.

It will be apparent from the foregoing description that the shifting of the gears into the three forward positions may be effected by the manipulation of the clutch lever and that the shifting of the gears into reverse position may also be effected by the operation of the clutch lever after the manual operation of a controlling device. When the transmission is in neutral the depression of the clutch lever will release the clutch and then actuate the controlling plate 20 to shift the gearing into low speed position. When the clutch is reengaged the gearing remains in the low speed position and when sufficient headway has been attained the clutch lever is again operated and the gearing shifted from low to second and subsequently by a third operation of the clutch lever it is shifted into high. The clutch may be released when the controlling members are in any of their positions, without imparting movement to the clutch members, by a partial depression of the clutch lever. When it is desired to restore the transmission to neutral position the operator depresses the clutch lever by first actuating the push rod 58 which establishes an operative connection between the clutch lever and the restoring device and moves the operating device to an inoperative position, so that a single downward thrust on the clutch lever will restore the transmission to neutral.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a gear shifting mechanism, separately operable gear actuating devices each comprising a stud, sliding controlling members movable with relation to said actuating devices and each having a cam groove to receive one of said studs and impart predetermined movements thereto, a non-rotatable reciprocatory operating device, and means for actuating said operating device, said operating device and said controlling members having cooperating parts to cause said controlling members to be operated in a predetermined order by the successive movements of said operating device.

2. In a gear shifting mechanism, separately operable gear actuating devices each comprising a stud, separately movable controlling members having cam grooves to receive the respective studs and impart predetermined movements thereto, a device for operating said controlling members, said controlling members having parts adapted to be engaged by said operating device and said parts being so arranged with relation one to the other that the successive movements of said operating device will cause said controlling members to be operated in a predetermined order, and means for operatively connecting said operating device with the clutch lever of an automobile.

3. In a gear shifting mechanism, separately operable gear actuating devices each comprising a stud, separately movable controlling members having cam grooves to receive the respective studs and impart predetermined movements thereto, each controlling member having a plurality of shoulders arranged in a line substantially parallel with the line of movement thereof, a reciprocatory operating device having a part adapted to move over said shoulders when said device is moved in one direction and to engage one or more of said shoulders and impart movement to one or both of said controlling members when said device is moved in the other direction, and means for actuating said operating device.

4. In a gear shifting mechanism, separately operable gear actuating devices each comprising a stud, controlling members movable in parallel paths and having cam grooves to receive the respective studs and impart predetermined movements thereto, each controlling member having a series of recesses substantially parallel with its line of movement, a reciprocatory operating device having a part arranged to move over said controlling members when said device is moved in one direction and to enter one or more of said recesses and impart movement to one or both of said controlling members when said device is moved in the other direction, said recesses being so arranged that the successive movements of said device in the last mentioned direction will actuate said controlling members in a predetermined order, and means for actuating said operating device.

5. In a gear shifting mechanism, separately operable gear actuating devices each comprising a stud, controlling members movable in parallel paths and having cam grooves to receive the respective studs and impart predetermined movements thereto, each controlling member having a series of recesses substantially parallel with its line of movement, a reciprocatory operating device having a part arranged to move over said controlling members when said device is moved in one direction and to enter one or more of said recesses and impart movement to one or both of said controlling members when said device is moved in the other direction, said recesses being so arranged that the successive movements of said device in the last mentioned direction will actuate said controlling members in a predetermined order, and means for so connecting said operating device with the clutch lever of an automobile that the movement of said lever in clutch releasing direction will move said operating device in the last mentioned direction.

6. In a gear shifting mechanism, two movable controlling members each having parts to be engaged by an operating device, means for operatively connecting said controlling members with the gears to be shifted, a reciprocatory operating device adapted to engage said parts of said controlling members and impart operative movement to the latter when said operating device is moved in one direction, said parts being so arranged that the first movement of said operating device in said direction will actuate only one of said controlling members, the second movement of said operating device in said direction will actuate both controlling members, and the third movement of said operating device in said direction will actuate only that controlling member which was not actuated by the first movement thereof, and means for imparting said movements to said operating member.

7. In a gear shifting mechanism, two movable controlling members each having parts to be engaged by an operating device, means for operatively connecting said controlling members with the gears to be shifted, a reciprocatory operating device adapted to engage said parts of said controlling members and impart operative movement to the latter when said operating device is moved in one direction, said parts being so arranged that successive movements of said operating device in said direction will cause said controlling members to shift said gears in their predetermined order, means for operatively connecting said operating device with the foot lever of an automobile, a device for restoring said controlling members to their initial positions, normally inoperative means for connecting said restoring device with said clutch lever, and means adapted to be supported by said clutch lever to establish an operative connection between said lever and said restoring device.

8. In a gear shifting mechanism, two movable controlling members each having parts to be engaged by an operating device, means for operatively connecting said controlling members with the gears to be shifted, a reciprocatory operating device adapted to engage said parts of said controlling members and impart operative movement to the latter when said operating device is moved in one direction, said parts being so arranged that successive movements of said operating device in said direction will cause said controlling members to shift said gears in their predetermined order, means for actuating said operating device, a device for restoring said controlling members to their initial positions, normally inoperative means for actuating said restoring device, means under the control of the operator for rendering the last mentioned means operative and for rendering the operating device inoperative.

9. In a gear shifting mechanism, gear actuating devices comprising studs, controlling plates mounted side by side for movement in parallel paths and having cam grooves to receive and impart operative movement to the respective studs, a reciprocatory operating device, said plates having parts cooperating with said operating device and so arranged that successive movements of said operating device in one direction will first advance one plate only to move the connected gear actuating device to low speed position, will then advance both plates to return the first mentioned device to its neutral position and to move the second gear actuating device to intermediate position, and will then advance the second plate only to move said second gear actuating device to high speed position, and means for operatively connecting said operating device with the clutch lever of an automobile.

10. In a gear shifting mechanism, gear actuating devices comprising studs, controlling plates mounted side by side for movement in parallel paths and having cam grooves to receive and impart operative movement to the respective studs, a reciprocatory operating device, said plates having parts cooperating with said operating device and so arranged that successive movements of said operating device in one direction will cause said plates to be advanced step by step to shift said gears, the cam groove of one of said plates having diverging branches adapted to move its stud to either low speed position or reverse position, means for adjusting said stud with relation to said groove to cause it to enter a selected one of said branches when said plate is actuated, and means for operatively connecting said operating device with the clutch lever of an automobile.

11. In a gear shifting mechanism, gear actuating devices comprising studs, controlling plates mounted side by side for movement in parallel paths and having cam grooves to receive and impart operative movement to the respective studs, said plates having recesses in their adjacent edges, a reciprocatory operating device having a part adapted to enter certain of said recesses and advance one or both of said plates, said recesses being so arranged that successive movements of said operating device will advance said plates in a predetermined order, and means for operatively connecting said operating device with the clutch lever of an automobile.

12. In a gear shifting mechanism, gear actuating devices comprising studs, controlling plates mounted side by side for movement in parallel paths and having cam grooves to receive and impart operative movement to the respective studs, an operating device acting on said plates to actuate the same in a predetermined order, means for operatively connecting said operating device with the clutch lever of an automobile, a member arranged to act on said plates to restore the same to their initial positions, a bell crank having one arm connected with said restoring device, a link having a slot into which the other arm of said bell crank extends and which is normally free to move with relation to said bell crank, means under the control of the operator to establish an operative connection between said link and said bell crank, and means for connecting said link with said clutch lever.

13. In a gear shifting mechanism, gear actuating devices comprising studs, controlling plates mounted side by side for movement in parallel paths and having cam grooves to receive and impart operative movement to the respective studs, an operating device acting on said plates to actuate the same in a predetermined order, means for operatively connecting said operating device with the clutch lever of an automobile, a member arranged to act on said plates to restore the same to their initial positions, a bell crank having one arm connected with said restoring device, a link having a slot into which the other arm of said bell crank extends and which is normally free to move with relation to said bell crank, means under the control of the operator to establish an operative connection between said link and said bell crank, means for connecting said link with said clutch lever, an operable device to support said operating device in an inoperative position during the operation of said restoring device, and means for actuating said supporting device.

14. In a gear shifting mechanism, gear actuating devices comprising studs, controlling plates mounted side by side for movement in parallel paths and having cam grooves to receive and impart operative movement to the respective studs, an operating device acting on said plates to actuate the same in a predetermined order, means for operatively connecting said operating device with the clutch lever of an automobile, a member arranged to act on said plates to restore the same to their initial positions, a bell crank having one arm connected with said restoring device, a link having a slot into which the other arm of said bell crank extends and which is normally free to move with relation to said bell crank, said link having a shoulder arranged to be moved into operative relation to said bell crank by the vertical movement of said link, a cam to impart movement to said link, an operable device to support said operating device in an inoperative position, an operative connection between said supporting device and said cam, means under the control of the operator for actuating said cam, and means for connecting said link with said clutch lever.

15. In a gear shifting mechanism, separately operable gear actuating devices, separately operable controlling members mounted for sliding movement with relation to said gear actuating devices and having means for imparting predetermined movements to said gear actuating devices, an operating device, said controlling members and said operating device having cooperating parts so arranged that successive movements of said operating device will cause said controlling members to be operated in a predetermined order and constituting the sole means for determining the position to which the gears will be shifted, and means for operatively connecting said operating device with the clutch lever of an automobile.

16. In a gear shifting mechanism, separately operable gear actuating devices, slidable controlling members movable either separately or in unison and having means for imparting predetermined movements to the respective gear actuating devices, a device for operating said controlling members, said controlling members having parts adapted to be engaged by said operating device and so arranged with relation one to the other that successive movements of said operating device will cause said controlling members to be operated in their predetermined order, and means for actuating said operating device.

17. In a gear shifting mechanism, separately operable gear actuating devices, separately movable controlling members having means for imparting predetermined movements to the respective gear actuating devices, each controlling member having a plurality of shoulders arranged to be engaged by an operating device, a reciprocatory operating device having a part adapted to move over said shoulders when said operating device moves in one direction and to engage one or more of said shoulders and impart movement to one or both of said controlling members when said operating device is moved in the other direction, and means for actuating said operating device.

18. In a gear shifting mechanism, separately operable gear actuating devices, separately movable controlling members having means for imparting predetermined movements to the respective gear actuating devices, an operating device, said operating device and said controlling members having cooperating parts arranged to establish different operative connections between said operating devices and said controlling members upon successive operations of said operating device, which connections will cause said controlling members to shift the gears successively from neutral to low, from low to intermediate and from intermediate to high, and means for actuating said operating device.

19. In a gear shifting mechanism, separately operable gear actuating devices, separately movable controlling members having means for imparting predetermined movements to the respective gear actuating devices, an operating device, said operating device and said controlling members having cooperating parts arranged to establish different operative connections between said operating device and said controlling members upon successive operations of said operating device, which connections will cause said controlling members to shift the gears successively from neutral to low, from low to intermediate and from intermediate to high, means for connecting said operating device with the clutch lever of an automobile, means for restoring said controlling members to their initial positions, and means under the control of the operator for connecting said restoring means with said clutch lever for operation thereby.

20. In a gear shifting mechanism, two relatively movable controlling members, means for operatively connecting said controlling members with the gears to be shifted, an operating device to impart operative movement to at least one of said controlling members upon each operation of said device, means controlled by the positions of said controlling members with relation one to the other and to said operating device to operatively connect said operating device with one or with both of said controlling members, and means for actuating said operating device.

21. In a gear shifting mechanism, two relatively movable controlling members, means for operatively connecting said controlling members with the gears to be shifted, an operating device to impart operative movement to at least one of said controlling members upon each operation of said device, each controlling member having a plurality of spaced parts adapted to be engaged by said operating device, the parts of one controlling member being so arranged with relation to the parts of the other controlling member that when said controlling members are in certain positions with relation one to the other and to said operating device said operating device will engage a part of one only of said controlling members and impart operative movement to that member, and when said controlling members are in other positions said operating device will engage parts of both controlling members and impart operative movement to both members, and means for actuating said operating device.

22. In a gear shifting mechanism, two relatively movable controlling members, means for operatively connecting said controlling members with the gears to be shifted, an operating device to impart operative movement to at least one of said controlling members upon each operation of said device, means controlled by the positions of said controlling members with relation one to the other and to said operating device to operatively connect said operating device with one or with both of said controlling members, means for actuating said operating device, a normally inoperative device to act on both controlling members to restore the same to their initial positions, and means under the control of the operator to render said restoring means operative.

23. In a gear shifting mechanism, two movable controlling members each having parts spaced one from the other in the direction of movement of said members and adapted to be engaged by an operating device, means for operatively connecting said controlling members with the gears to be shifted, a reciprocatory operating device adapted to engage one of the parts of at least one of said controlling members and impart operative movement to the latter upon each operation of said operating device, said parts being so arranged that successive operations of said operating device will cause said controlling members to shift said gears in their predetermined order, means for actuating said operating device, and means for rendering said operating device inoperative and restoring said controlling members to their initial positions.

24. In a gear shifting mechanism, gear actuating devices comprising studs, separately movable controlling plates mounted side by side for movement in parallel paths and having cam grooves to receive and impart operative movement to the respective studs, an operating device adapted to impart a predetermined movement either to one or to both of said plates upon each operation of said device, said operating device and said plates having cooperating parts so arranged that different parts will be brought into cooperating relation as said plates are advanced step by step by the successive operations of said operating device, and means for operatively connecting said operating device with the clutch lever of an automobile.

25. In a gear shifting mechanism, gear actuating devices comprising studs, separately movable controlling plates mounted side by side for movement in parallel paths and having cam grooves to receive and impart operative movement to the respective studs, a reciprocatory operating device adapted normally to advance either one or both of said plates upon each complete reciprocation of said operating device, said plates having parts arranged to be brought successively into cooperating relation to said operating device as said plates are advanced step by step by the successive reciprocations of said operating device, and means for operatively connecting said operating device with the clutch lever of an automobile.

THEODORE G. MEHLBERTH.